No. 856,081. PATENTED JUNE 4, 1907.
T. MIDGLEY.
VEHICLE WHEEL.
APPLICATION FILED AUG. 25, 1905.
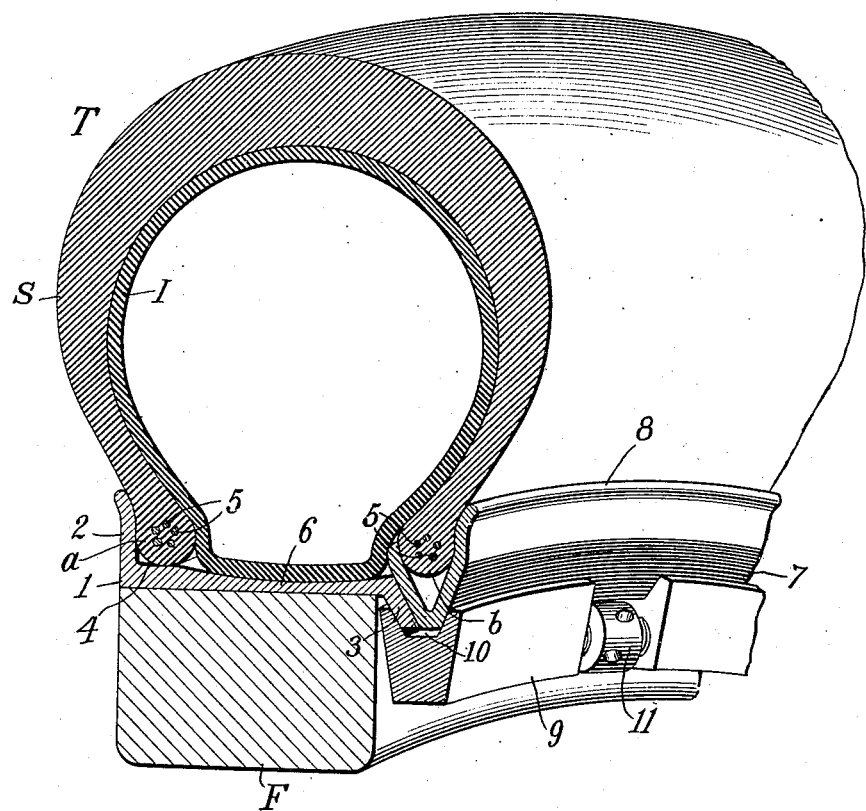

UNITED STATES PATENT OFFICE.

THOMAS MIDGLEY, OF HARTFORD, CONNECTICUT.

VEHICLE-WHEEL.

No. 856,081.  Specification of Letters Patent.  Patented June 4, 1907.

Application filed August 25, 1905. Serial No. 275,739.

*To all whom it may concern:*

Be it known that I, THOMAS MIDGLEY, a citizen of the United States, residing in Hartford, county of Hartford, and State of Connecticut, have invented new and useful Improvements in Vehicle-Wheels, of which the following is a specification.

This invention relates to vehicle wheels and more particularly to tires and rims for such wheels.

The invention contemplates the provision of an improved resilient tire for vehicle wheels and of an improved rim for such wheels adapted for coöperation with the tire to afford a seat therefor and provide means for effectively securing the tire in position upon the wheel. As is well known, resilient tires for vehicle wheels and particularly wheels of motor vehicles are more or less difficult of application to and removal from the wheels, and in some types of tires there is a considerable tendency of the tire to "creep" on the wheel. This is particularly true of pneumatic tires which are apt to slip upon the wheel rim when partially deflated, if positive clamping or anchoring devices are not employed expressly to prevent such slipping.

Various devices have been devised for the purpose of preventing the slipping or "creeping" of pneumatic tires upon wheel rims and it is the primary object of the present invention to improve upon such devices by providing a tire and rim construction of such character that the tire may be very quickly and easily removed from the wheel or applied thereto but will be positively and securely held in position on the wheel whether inflated or partially deflated, so that "creeping" is rendered impossible and the injury to the tire which would result therefrom is wholly obviated.

The objects above stated and others which will hereinafter appear are attained in the tire and rim construction hereinafter described in detail and shown in the accompanying drawing, in which a section of the tire, the rim, and the felly of the wheel are shown in perspective.

The scope of the invention is hereinafter clearly pointed out in the appended claims.

Referring to the drawing by the reference characters marked thereon, F designates the felly of the wheel which may be of any suitable construction, and 1 designates the main member of the rim, which presents at one margin an upstanding or outwardly disposed fixed flange 2, which is preferably given a slight lateral curvature, as shown. At the opposite margin the main rim member presents a downwardly or inwardly turned and inclined lip 3. Between the upstanding or outwardly disposed flange 2 and the inwardly or downwardly disposed lip 3 the outer face or surface of the main rim member is shaped to afford a suitable seat for the greater portion of the tire which is designated generally as T. Adjacent to the flange 2 is the seat 4 for one margin of the tire shoe or casing S, which is of the type commonly known as the "Dunlop" and is provided near its margins with inextensible reinforcing wires 5, which determine accurately the circumference of the shoe or casing at the margins. The seat 4 for one edge of the shoe or casing is a little higher or farther removed from the axis of the wheel than the remaining portion 6 of the outer surface of the main rim member, the surface 6 presenting a slight depression to facilitate the passage of the edge of the tire shoe or casing over it as the tire is applied to or removed from the rim. The depression serves as a seat for the inner portion of the expansible inner tube I of the tire.

The tire shoe or casing S, while characterized by reinforcing wires or bands which render the margins inextensible, differs from the ordinary "Dunlop" type of tire casing in having one margin of the casing provided with a protective sheath. The margin *a*, which contacts with the flange 2, is not sheathed, but the other margin *b* of the shoe or casing is provided with a channeled ring 7 which is of fixed diameter and is firmly secured upon the margin of the tire shoe or casing so that it becomes permanently a part thereof. This ring 7 may be applied to the margin of the shoe or casing in any suitable manner, but it is preferably done by taking an uncut ring of sufficiently small diameter to be easily placed in position with the margin *b* of the shoe or casing loosely engaging the channel of the ring and then forcibly expanding the ring until the margin of the shoe or casing is firmly seated in the channel, as shown in the drawing. The ring will then become in effect a part of the tire shoe or casing and be removable from the wheel therewith.

As shown in the drawing, the inner or channeled portion of the ring 7 is substantially V shaped or wedge shaped in cross-section and one side of this channeled portion of the ring is adapted to rest against the outer face of the inclined lip 3 of the main rim member. The other side of the channeled portion of the ring is extended to present an upstanding flange 8 which has a slight lateral curl at its free margin and this flange supports the adjacent portion of the tire in substantially the same manner as the fixed flange 2 upon the main rim member supports the opposite portion of the tire.

Various devices may be employed for holding the channeled ring 7 in engagement with the lip 3 of the main rim member, but I preferably employ for this purpose an expansible channeled ring 9 provided with a turnbuckle 11 or equivalent device for expanding and contracting it. The ring 9 is characterized by a channel 10 having divergent sides which engage with the lip 3 and the ring 7 upon the tire casing to wedge them firmly together when the ring 9 is expanded. When the ring 9 is contracted sufficiently, the ring 7 is released and the tire may be removed without difficulty from the wheel. In applying a tire of the kind described and illustrated to the rim, the shoe or casing and the expansible inner tube are slipped into position on the rim at one operation, the ring 7 being brought at once into contact with the inclined lip 3 of the main rim member, upon which it approximately seats itself. The previously contracted ring 9 is then slipped within the ring 7 and expanded by means of the turnbuckle 11 or other expanding device until the ring 7, the ring 9, and the lip 3 are all wedged firmly together.

The operation of removing the tire from the wheel is the exact reverse of the operation of applying it and is effected by simply contracting the channeled ring 9 until it can be disengaged from the lip 3 and then slipping the tire laterally over the lip 3 and off the wheel.

From the foregoing description and the accompanying drawing it will be noted that when the tire is in position upon the wheel, one margin of the outer casing is positively clamped and that any "creeping" of the tire on the rim is prevented, whether the tire be inflated or deflated. It will also be noted that the rim comprises a main member, which has one side flange forming an integral portion thereof and a removable side flange which is permanently associated with the tire and is integral with the channeled ring in which one margin of the tire casing is seated. It will likewise be seen that only one margin of the tire casing must be slipped over the main rim member to seat the tire upon the rim, the other margin being designed for contact with the lip at the edge of the rim and therefore simplifying the operation of placing the tire in position upon the rim.

The advantages of having the margin of the tire casing which is positively clamped, protected by means of a sheath such as the ring 7 will be obvious. This ring, which is preferably formed of soft steel of suitable gage, is substantially incompressible and consequently prevents the clamped margin of the tire from working loose when in use and renders accidental detachment of the tire practically impossible. Moreover, there is practically no wear upon the ring and there is never any difficulty in securing the tire perfectly upon the rim, even after the tire has been in use for a long period and the tread may be almost worn out.

While I have described and illustrated the invention as embodied only in pneumatic tires, it is to be understood that certain features of the invention may be embodied in tires of other types, although the invention is primarily designed for use in connection with pneumatic tires, in which the effects of "creeping" are more pronounced than in other tires and which must be more frequently removed from the wheel.

Having thus described my invention, what I claim as new and desire to secure by Letters Patent is:

1. In a vehicle wheel, the combination with a rim having a lip or bead at one margin thereof, of a tire having an incompressible edge portion adapted to seat against said bead, and a channeled member adapted to receive both said bead and the incompressible edge of said tire and hold the tire in place.

2. In a vehicle wheel, the combination with a wheel rim having a bead or lip projecting inwardly from the wheel face thereof at one margin, of a tire having an incompressible edge adapted to seat against said bead or rim, and a channeled member adapted to receive said bead or lip and the edge of the tire seating thereagainst and secure them in place.

3. In a vehicle wheel, the combination with a wheel rim having a lateral portion adapted to form a seat for one margin of the wheel tire, of a tire having an incompressible and inextensible edge portion adapted to seat against said lateral portion of the wheel rim, and an expansible and contractible locking ring by the expansion of which the edge portion of the tire is secured in position against the lateral portion of the wheel rim.

4. In a vehicle wheel, the combination with a wheel rim having at one margin an inwardly and laterally inclined bead or lip, of a tire provided with an incompressible and inextensible edge portion of substantially V-shaped cross-section adapted to seat against said bead or lip, and means for wedging said edge portion into close engagement with said bead or lip.

5. In a vehicle wheel, the combination with a wheel rim presenting at one edge a lateral face adapted to serve as a seat for one edge of a tire, of a tire provided with an inextensible edge portion seated against said face, and an expansible locking ring adapted to engage said rim and the inextensible edge of the tire to secure them in proper relation.

6. In a vehicle wheel, the combination with a wheel rim presenting a lateral face serving as a tire-seating surface, of a tire having an edge adapted to seat upon said lateral face, and a channeled locking ring adapted to receive the edge of the tire and a portion of the rim and hold them in proper relation.

In testimony whereof, I have signed my name in the presence of two witnesses.

THOMAS MIDGLEY.

Witnesses:
   Wm. P. Calder,
   S. G. Pierce.